United States Patent [19]

Dixon

[11] 3,964,824
[45] June 22, 1976

[54] LIGHT TRANSMITTER

[76] Inventor: Robert L. Dixon, Rte. 1, Winchester, Tenn. 37398

[22] Filed: Oct. 3, 1974

[21] Appl. No.: 511,698

[52] U.S. Cl. .............................. 350/190; 350/96 B; 350/188; 356/138
[51] Int. Cl.² .......................................... G02B 3/08
[58] Field of Search .................. 350/96 B, 190, 128, 350/188; 250/227; 356/138

[56] References Cited
UNITED STATES PATENTS

| | | | |
|---|---|---|---|
| 3,437,405 | 4/1969 | Northrop | 350/190 |
| 3,508,589 | 4/1970 | Derick et al. | 350/96 B |
| 3,827,783 | 8/1974 | Lemelson | 350/128 |

*Primary Examiner*—John K. Corbin
*Assistant Examiner*—Richard A. Rosenberger

[57] ABSTRACT

An optical system adapted to direct a plane of light in a 360° pattern. This is accomplished by directing a beam of light from a laser onto and normal with a bundle of fiber optics. The beam is reflected and refracted by the optical elements sufficiently to produce an essentially continuous amplitude plane of light over a 360° pattern.

5 Claims, 4 Drawing Figures

U.S. Patent June 22, 1976     3,964,824

LIGHT TRANSMITTER

BACKGROUND OF THE INVENTION

Field of the Invention

This invention relates to methods and devices for projecting a reference beam of light such as described in U.S. Pat. No. 3,775,929. As set forth therein, the reference beam generated by a laser is rotated and thereby a planar reference is made available for the purpose of installing ceiling panels. There are, of course, a number of other applications for a device which will produce a planar beam extending out from and around 360° from the point of projection. One example would be a lighthouse beacon. Another would be an omnidirectional light antenna.

As with all types of machinery, in order for a device to do well in the marketplace it must not be overly expensive and it must operate reliably. In accomplishing these goals, one normally seeks the simplest construction possible, keeping down the number of components and reducing or eliminating any moving parts which might wear and produce breakdown or deteriorate operation.

So, in the present case, it is the object of this invention to provide a simpler and less expensive light plane generator and one which has no moving parts in operation.

SUMMARY OF THE INVENTION

In accordance with this invention, a collimated light source directs a beam of light onto the side of a bundle of fiber optical elements. As a result, the inventor has discovered that the multiple reflections and refractions which occur in and between the optical elements produce a circle of light emanating from the fiber optics.

DETAILED DESCRIPTION OF THE DRAWINGS

Figure 1:
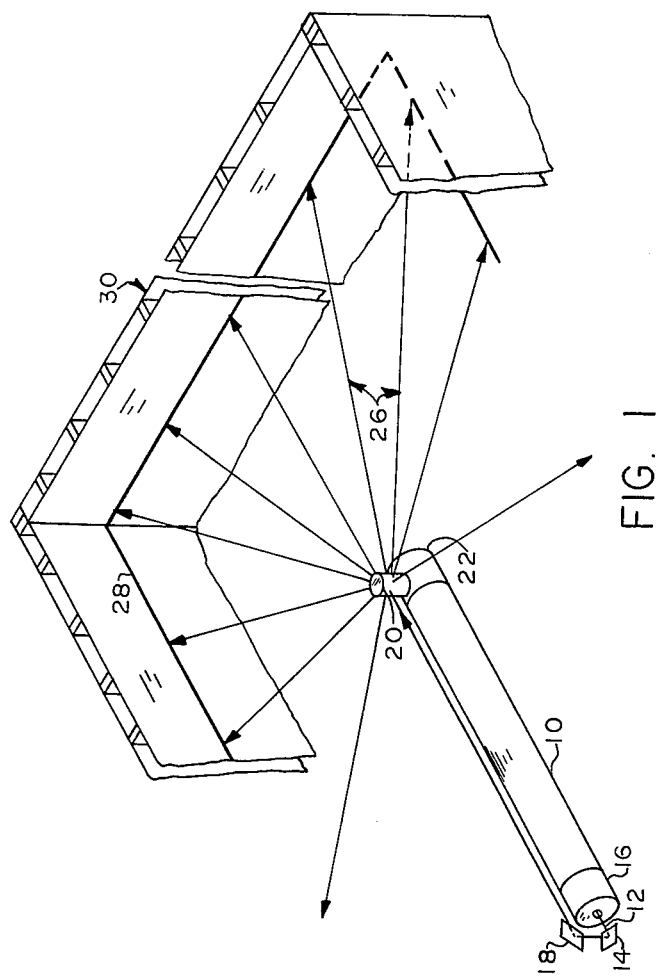
FIG. 1 is a perspective view of the invention and an illustration of its use.
Figure 2:
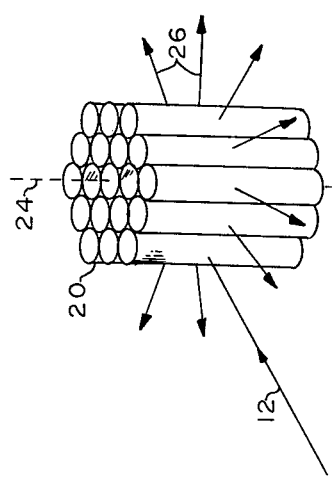
FIG. 2 is a pictoral view of a portion of a bundle of fiber optics as contemplated by the invention.
Figure 3:
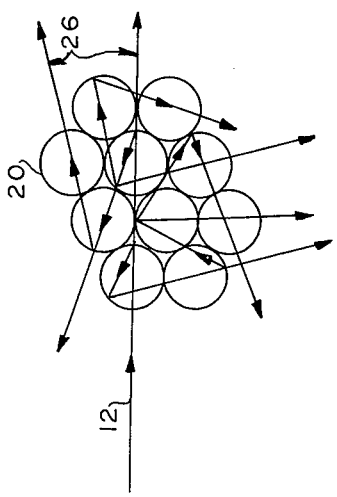
FIG. 3 is an optical diagram partially illustrating the manner in which the invention functions to provide a circular plane of light.

Referring to FIG. 1, laser 10 would emit along its central axis a monochromatic coherent light beam 12 of a circular nature with a diameter approximately 0.2 inch. Alternately, a source of collimated light having a mixture of colors may be employed. A small mirror 14 is physically attached to case 16 of laser 10 and positioned at an angle of 45° with respect to the beam. It thereby directs the beam upward at an angle of 90°, with respect to the axis of the laser, where it intersects a second mirror 18 mounted on laser 10 and positioned at a 45° angle with respect to the received beam. As a result, mirror 18 redirects the beam parallel to the axis of the laser onto bundle 20 of fiber optics positioned and mounted in the path of the beam. This bundle is approximately the diameter of the width of the beam as is the length of the bundle. Fiber optic bundle 20 is attached, in this case, at an opposite end 22 of laser 10 and is oriented with the longitudinal axis 24 (FIG. 2) normal to the direction of beam 12. Beam 12 then strikes fiber optic bundle 20 at a right angle to its surface. As a result, there is produced an almost infinite number of lateral beams 26 which combine to comprise a plane of light, which plane essentially draws a line 28 on a surface within its range. As shown, line 28 extends at a fixed elevation around walls 30 of a building. This demonstrates the employment of the invention to locate a fixed elevation line around the walls of the building as might be used to install a ceiling, molding, or most any fixture. In the event that beam 12 strikes optical bundle 20 at some angle other than normal to its central axis, a cone of light will be generated. This cone will have its apex at the point of incidence and will be projected toward the angle of tilt. The more the bundle is tilted, the smaller the apex angle becomes in any direction.

The density of fiber optics may, of course, be varied. A typical arrangement which has been found to work well employs 78,000 fiber elements in a bundle two millimeters in diameter with all fiber elements being co-parallel. In any event, in order to provide good continuity of light, there must be thousands of optical fibers in a bundle of this size, which is typically the case with commercially available fiber optical units.

It is, of course, to be appreciated that depending upon the power of the laser employed, the distance at which the plane of light may be projected may be varied. One interesting application of the invention would be for a lighthouse at sea, or for that matter, for any type of optical beacon where the projection of a continuous 360° plane of light is desired.

Figure 4:
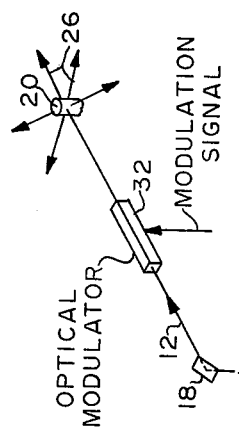
FIG. 4 is a schematic diagram, partially pictoral, of a modification of the device shown in FIG. 1 wherein a light beam would be modulated prior to being radiated.

FIG. 4 illustrates the insertion of an optical modulator 32 in laser beam 12 prior to its striking fiber optic bundle 20. Thus, for example, an optical beacon could provide a means of communication. It is to be further appreciated that laser 10 could be of a continuous wave type or of a pulse type. When of the latter type, pulsing may be effected in accordance with communications symbols, such as by Morse code or some digital code, by pulsing the laser directly.

Having thus described my invention, what is claimed is:

1. A light transmitter comprising:
   a supporting frame;
   light source means supported by said frame for generating and projecting a collimated beam of light; and
   a bundle of straight parallel lengths of fiber optics supported by said frame and spaced from said light source means, said bundle of fiber optics being positioned in the path of said beam with the beam intersecting a side of the bundle of optics normal (90°) to the central axis of said bundle;
   whereby the beam is reflected and refracted by surfaces of said fiber optics of said bundle in a substantially solid plane of light extending 360° around said bundle and being coincident with said beam of light from said light source means.

2. A transmitter as set forth in claim 1 wherein a width of said beam and the width of said bundle of fiber optics are substantially identical.

3. A transmitter as set forth in claim 2 further comprising an optical modulator positioned to intercept, modulate, and transmit a modulated beam to said bundle of fiber optics.

4. A transmitter as set forth in claim 2 wherein said source of light comprises a source of monochromatic light.

5. A transmitter as set forth in claim 4 wherein:
said light source comprises a laser and said frame comprises an elongated housing supporting and surrounding said laser, the latter being positioned to emit a said beam of light out of a first end of said housing and generally along the longitudinal axis of said housing;

a first mirror and means for positioning said mirror on said first end of said housing, said mirror being oriented whereby said beam of light is reflected at essentially 90° with respect to the longitudinal axis of said housing;

a second mirror and means for mounting said second mirror on said first end of said housing and oriented to intercept a beam of light from said first mirror and directing said beam essentially along a line parallel to said longitudinal axis of said housing; and mounting means for mounting said bundle of lengths of fiber optics on said housing at a point spaced from said second mirror and positioned to intercept said beam of light as directed from said second mirror.

* * * * *